(12) United States Patent
Kessler et al.

(10) Patent No.: US 10,518,236 B2
(45) Date of Patent: Dec. 31, 2019

(54) SYSTEMS FOR HEATING MULTI-TUBULAR REACTORS

(71) Applicant: SABIC Global Technologies B.V., Bergen op Zoom (NL)

(72) Inventors: John B. Kessler, Windham, NH (US); Slawomir A. Oleksy, Billerica, MA (US); John David Andrews, Boxborough, MA (US); Michael S. Groves, Boston, MA (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/301,134

(22) PCT Filed: Jun. 5, 2017

(86) PCT No.: PCT/IB2017/000866
§ 371 (c)(1),
(2) Date: Nov. 13, 2018

(87) PCT Pub. No.: WO2017/212341
PCT Pub. Date: Dec. 14, 2017

(65) Prior Publication Data
US 2019/0134588 A1    May 9, 2019

Related U.S. Application Data

(60) Provisional application No. 62/347,977, filed on Jun. 9, 2016.

(51) Int. Cl.
*B01J 8/00* (2006.01)
*B01J 8/02* (2006.01)
(Continued)

(52) U.S. Cl.
CPC ............... *B01J 8/062* (2013.01); *B01J 8/067* (2013.01); *B01J 2208/00504* (2013.01)

(58) Field of Classification Search
CPC ....... B01J 8/00; B01J 8/02; B01J 8/062; B01J 8/067; B01J 19/00; B01J 19/24;
(Continued)

(56) References Cited

U.S. PATENT DOCUMENTS

| 5,162,104 A | 11/1992 | Bezzeccheri et al. ........ 422/193 |
| 8,134,040 B2 | 3/2012 | Kosters .......................... 585/654 |

(Continued)

FOREIGN PATENT DOCUMENTS

| DE | 10229661 | 4/2003 |
| EP | 0380192 | 8/1990 |

(Continued)

OTHER PUBLICATIONS

Fattahi et al. "Fixed-Bed Multi-Tubular Reactors for Oxidative Dehydrogenation in Ethylene Process." Chem. Eng. Technol., vol. 36, Issue 10 (2013) 1691-1700.
(Continued)

*Primary Examiner* — Natasha E Young
(74) *Attorney, Agent, or Firm* — Norton Rose Fulbright US LLP

(57) ABSTRACT

Systems for heating multi-tubular reactors are provided. Systems can include one or more reaction panels including multiple vertically-oriented reaction tubes, each including a catalyst bed, which can be located within a furnace. A burner system can provide a flue gas to the furnace, and the flue gas can enter one or more distribution chambers such flue gas in the distribution chambers does not contact the portion of the reaction tubes containing the catalyst bed. The flue gas can travel from the distribution chambers and through one or more convection chambers to flow co-currently with a feedstream within the reaction tubes.

20 Claims, 8 Drawing Sheets

(51) Int. Cl.
  *B01J 8/06*    (2006.01)
  *B01J 19/00*   (2006.01)
  *B01J 19/24*   (2006.01)

(58) Field of Classification Search
  CPC .... B01J 19/2415; B01J 2208/00–00017; B01J 2208/00504; B01J 8/06
  See application file for complete search history.

(56) References Cited

U.S. PATENT DOCUMENTS

| | | |
|---|---|---|
| 8,916,737 B2 | 12/2014 | Kosters .................. 585/654 |
| 2008/0247942 A1 | 10/2008 | Kandziora et al. .......... 423/651 |
| 2011/0160314 A1 | 6/2011 | Schrauwen ............... 518/712 |

FOREIGN PATENT DOCUMENTS

| | | |
|---|---|---|
| EP | 1193219 | 4/2002 |
| EP | 1734002 | 12/2006 |
| FR | 2676222 | 9/1994 |
| GB | 327025 | 3/1930 |
| WO | WO2002/026370 A1 | 4/2002 |
| WO | WO2006/053734 A1 | 5/2006 |
| WO | WO2009/057909 A2 | 5/2009 |
| ZA | 9901067 | 8/1999 |

OTHER PUBLICATIONS

International Search Report and Written Opinion from PCT/IB2017/000866, dated Oct. 5, 2017, 10 pages.

SYSTEMS FOR HEATING MULTI-TUBULAR REACTORS

CROSS-REFERENCE TO RELATED APPLICATIONS

This application is a national phase application under 35 U.S.C. § 371 of International Application No. PCT/IB2017/000866, published as WO 2017/212341, filed Jun. 5, 2017, which claims priority to U.S. Provisional Patent Application No. 62/347,977 filed Jun. 9, 2016. The entire contents of each of the above-referenced disclosures is specifically incorporated by reference herein without disclaimer.

FIELD

The disclosed subject matter relates to systems for heating multi-tubular reactors.

BACKGROUND

Multi-tubular reactors are used in many chemical processes, for example, catalytic chemical processes. Generally, multi-tubular reactors are arranged as a bundle having multiple parallel reaction tubes. In catalytic processes, the reaction tubes can contain a fixed catalyst bed. The reaction tubes can be vertically-oriented, allowing the chemical reactants to flow downwards, and through the catalyst bed. The multiple reaction tubes are generally connected by a feed header, which apportions the chemical reactants to the reaction tubes.

In certain processes, it is desirable to heat a multi-tubular reactor, for example, in order to heat an endothermic reaction and alter the equilibrium point of the chemical reaction. In such situations, a multi-tubular reactor can be placed within a furnace to provide heat to the reaction tubes. A furnace can provide both radiant heat, e.g., from a burner, and convective heat, e.g., from a flue gas. However, placing a multi-tubular reactor within a furnace poses certain design challenges. For example, although it can be advantageous to heat the reaction tubes with both radiant and convective heat transfer, radiant heat transfer can cause hot spots to form on the walls of the reaction tubes, leading to undesirable side reactions, e.g., cracking and coking of reactant or product molecules. Further, to optimize the temperature profile of the chemical reactant, it can be advantageous if the flow of the flue gas is co-current with the flow of the reactants, and ideally, has no horizontal velocity component if the reaction tubes are vertical. Co-current flow can also maintain an appropriate temperature distribution along the walls of the reaction tubes, for example, to avoid high temperatures at the bottoms of the reaction tubes where chemical products, which may be more prone to coking, are present.

Additionally, the multi-tubular reactor should be designed to permit periodic access to the catalyst beds for change-outs of spent catalyst, but for safety reasons, must also be completely sealed off from the flue gas. For example, catalyst beds can be accessed through the feed header, but if the feed header is disposed within the flow of the flue gas, it must be made of a heat resistant material and heat from the flue gas can cause fouling or coking within the feed header.

Certain multi-tubular reactors are known in the art. For example, U.S. Pat. No. 8,134,040 discloses a reaction panel including a feed header, a product header, and parallel reaction tubes from the feed header to the product header, each containing a catalyst. The catalyst can be accessed via detachable portions of the feed header and/or product header. FR2676222 discloses a fixed bed multi-tubular reactor for producing olefins that is heated radiantly, and operated in two stages: a reaction and a catalyst regeneration stage. International Publication No. WO2002/026370 discloses a process for catalytically reacting a fluid reactant stream in a multi-tubular reactor. The reaction tubes of the multi-tubular reactor have one or more rod-shaped inserts to promote heating or cooling of the reactant or product stream and curb side reactions in the product stream. U.S. Patent Publication No. 2011/0160314 discloses a reactor including multiple reaction tubes, which pass through a coolant chamber enclosed by top and bottom horizontal plates. The reaction products and the coolant preferably flow co-currently upwards through the tubes and chamber.

However, there remains a need for improved techniques for efficiently heating multi-tubular reactors. The present disclosure addresses these and other needs.

SUMMARY OF THE DISCLOSED SUBJECT MATTER

The disclosed subject matter provides novel techniques for heating a multi-tubular reactor.

In certain embodiments, an exemplary system for heating a multi-tubular reactor includes one or more combustion chambers in fluid communication with a furnace and one or more reaction panels including multiple vertically-oriented parallel reaction tubes disposed within the furnace, where at least a portion of each reaction tube contains a catalyst bed. The system further includes one or more distribution chambers arranged such that flue gas within the distribution chambers does not contact the portion of the reaction tubes that contains the catalyst beds and one or more convection chambers arranged such that flue gas within the convection chambers contacts the portion of the reaction tubes that contains the catalyst beds. The flue gas is generated within the one or more combustion chambers, then enters the one or more distribution chambers and exits through the distribution chambers and into the one or more convection chambers.

In certain embodiments, each distribution chamber has a closed bottom and an open top and is defined by at least two vertically-oriented guiding walls. Each distribution chamber can be disposed adjacent to at least one reaction panel. Each guiding wall can span an entire width of the furnace. The system can further include one or more deflection zones above the one or more distribution chambers and in fluid communication with the one or more convection chambers.

In certain embodiments, the one or more distribution chambers are above the one or more convection chambers and defined by a distributor having openings. The distributor can be in fluid communication with the one or more convection chambers. In certain embodiments, the one or more combustion chambers include one or more burner systems.

In certain embodiments, the system further includes a feed header, coupled to two or more of the reaction tubes and disposed above the reaction tubes, for distributing a feed-stream to the reaction tubes to create a flow within the reaction tubes. The system can further include a product header, coupled to two or more of the reaction tubes and disposed below the reaction tubes, for combining two or more product streams from the reaction tubes. The flue gas can travel downward through the one or more convection chambers co-currently with the flow within the reaction tubes.

In certain embodiments, the furnace includes a furnace ceiling that defines a closed top, and at least a portion of the feed header extends above the furnace ceiling. In certain embodiments, the entire feed header is disposed above the furnace ceiling. The feed header can include one or more fitting devices. The furnace can include one or more slits in fluid communication with the distribution chamber.

In certain embodiments, the one or more distribution chambers include one or more baffles. The baffles can be curved. In certain embodiments, the one or more distribution chambers include a distributor having one or more openings. The distributor can include a plurality of parallel rods. The rods can have a triangular cross-section. In certain embodiments, the distributor forms a downward chevron.

In the context of the present invention, embodiments 1-19 are described. Embodiment 1 is a system for heating a multi-tubular reactor with a flue gas. The system includes (a) one or more combustion chambers in fluid communication with a furnace; (b) one or more reaction panels including multiple vertically-oriented parallel reaction tubes disposed within the furnace, wherein at least a portion of each reaction tube includes a catalyst bed; (c) one or more distribution chambers arranged such that flue gas within the distribution chambers does not contact the portion of the reaction tubes that includes the catalyst beds; and (d) one or more convection chambers arranged such that flue gas within the convection chambers contacts the portion of the reaction tubes that comprises the catalyst beds, wherein: i. the flue gas is generated within the one or more combustion chambers; ii. the flue gas enters the one or more distribution chambers; and iii. the flue gas exits through the distribution chambers and into the one or more convection chambers. Embodiment 2 relates to the system of Embodiment 1, wherein each distribution chamber has a closed bottom and an open top and is defined by at least two vertically-oriented guiding walls, and wherein each distribution chamber is disposed adjacent to at least one reaction panel. Embodiment 3 relates to the system of Embodiments 1 or 2, wherein each guiding wall spans an entire width of the furnace. Embodiment 4 is directed to the Embodiments 1 to 3 further includes one or more deflection zones above the one or more distribution chambers and in fluid communication with the one or more convection chambers. Embodiment 5 is directed to the system of Embodiments 1 to 4, wherein the one or more distribution chambers are above the one or more convection chambers and defined by a distributor comprising openings, wherein the distributor is in fluid communication with the one or more convection chambers. Embodiment 6 is the system of Embodiments 1-5, wherein the one or more combustion chambers comprise one or more burner systems.

Embodiment 7 is directed to the system of Embodiments 1-6, further including a feed header, coupled to two or more of the reaction tubes and disposed above the reaction tubes, for distributing a feedstream to the reaction tubes to create a flow within the reaction tubes. Embodiment 8 is the system of Embodiments 1 to 7, further including a product header, coupled to two or more of the reaction tubes and disposed below the reaction tubes, for combining two or more product streams from the reaction tubes. Embodiment 9 is the systems of Embodiments 1 to 8, wherein the flue gas travels downward through the one or more convection chambers co-currently with the flow within the reaction tubes. Embodiment 10 is the system of Embodiments 1 to 9, wherein the furnace includes a furnace ceiling that defines a closed top, and at least a portion of the feed header extends above the furnace ceiling. Embodiment 11 relates to the system of Embodiments 7-10, wherein the entire feed header is disposed above the furnace ceiling. Embodiment 12 is the system of Embodiments 7-11, wherein the feed header comprises one or more fitting devices. Embodiment 13 is the system of Embodiments 1 to 6, wherein the furnace comprises one or more slits in fluid communication with the distribution chamber. Embodiment 14 is the system of any one of Embodiments 1-12, wherein the one or more distribution chambers comprise one or more baffles. Embodiment 15 is the system of Embodiment 14 wherein the baffles are curved. Embodiment 16 is the system of Embodiments 1-14, wherein the distribution chamber comprises a distributor having one or more openings. Embodiment 17 is the system of Embodiment 16, wherein the distributor comprises a plurality of parallel rods. Embodiment 18 is the system of Embodiment 17 wherein the rods have a triangular cross-section. Embodiment 19 is the system of any one of Embodiments 16-18, wherein the distributor forms a downward chevron.

The use of the word "a" or "an" when used in conjunction with the term "comprising" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements.

The systems of the present invention can "comprise," "consist essentially of," or "consist of" particular features, components, etc. disclosed throughout the specification.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description.

DETAILED DESCRIPTION

The presently disclosed subject matter provides novel systems for heating a multi-tubular reactor.

As used herein, the term "about" or "approximately" means within an acceptable error range for the particular value as determined by one of ordinary skill in the art, which will depend in part on how the value is measured or determined, i.e., the limitations of the measurement system. For example, "about" can mean a range of up to 20%, up to 10%, up to 5%, and or up to 1% of a given value.

"Coupled" as used herein refers to the connection of a system component to another system component by any suitable means known in the art. The type of coupling used to connect two or more system components can depend on the scale and operability of the system. For example, and not by way of limitation, coupling of two or more components of a system can include one or more joints, valves, transfer lines or sealing elements. Non-limiting examples of joints include threaded joints, soldered joints, welded joints, compression joints and mechanical joints. Non-limiting examples of fittings include coupling fittings, reducing coupling fittings, union fittings, tee fittings, cross fittings and flange fittings. Non-limiting examples of valves include gate valves, globe valves, ball valves, butterfly valves and check valves.

The disclosed subject matter provides systems for heating a multi-tubular reactor. An exemplary system for heating a multi-tubular reactor includes one or more combustion chambers in fluid communication with a furnace and one or more reaction panels including multiple vertically-oriented parallel reaction tubes disposed within the furnace, where at least a portion of each reaction tube contains a catalyst bed. The system further includes one or more distribution chambers arranged such that flue gas within the distribution chambers does not contact the portion of the reaction tubes that contains the catalyst beds and one or more convection chambers arranged such that flue gas within the convection chambers contacts the portion of the reaction tubes that contains the catalyst beds. The flue gas is generated within the one or more combustion chambers, then enters the one or more distribution chambers and exits through the distribution chambers and into the one or more convection chambers.

Figure 1:
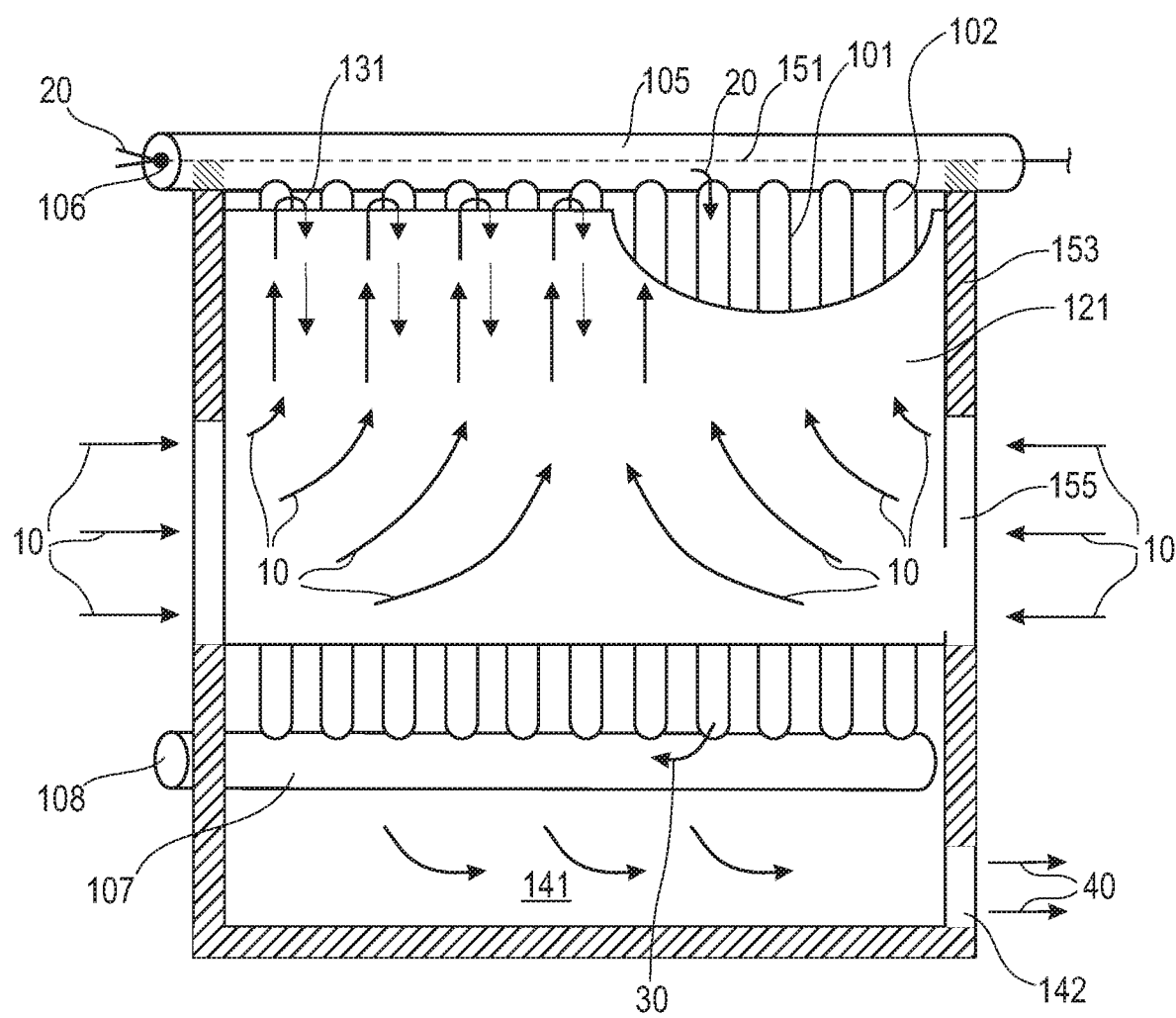
FIG. 1 depicts a front view of a system for heating a multi-tubular reactor according to an exemplary embodiment of the disclosed subject matter.
Figure 2:
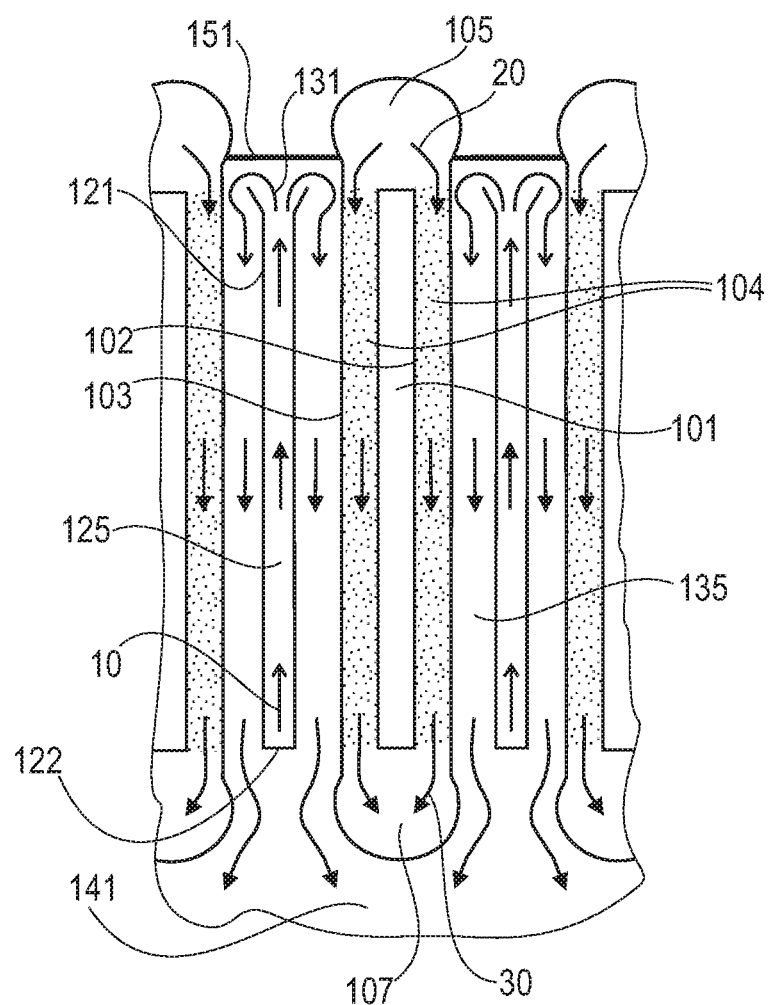
FIG. 2 depicts a side view of a system for heating a multi-tubular reactor according to an exemplary embodiment of the disclosed subject matter.

For the purpose of illustration and not limitation, FIGS. 1 and 2 provide a schematic representation of a system according to a non-limiting embodiment of the disclosed subject matter, where FIG. 1 is a front view and FIG. 2 is a side view. In FIG. 1, portions of the system are depicted as cut away to show the arrangement of the components. With reference to FIGS. 1 and 2, the system can include one or more reaction panels 101 separated by at least two guiding walls 121, which can define a distribution chamber 125 between the reaction panels. Each reaction panel can be a single self-supporting module, and with these panels as modules, a reactor of desired dimensions and capacity can be built. The channels of such panels are easily accessible for emptying, cleaning and (re)filling with catalyst, e.g., by detaching a detachable part of at least one header. Moreover, the panels can be separately and easily exchanged in the reactor. The reaction panels and distribution chamber can be located within a furnace. A flue gas can travel to the furnace, e.g., from a combustion chamber and one or more inner ducts, and to the distribution chamber 125, then upwards to a deflection zone 131. The deflection zone 131 can direct the flue gas downwards and through a convection chamber 135 between the guiding wall 121 and the reaction panel 101. For exemplary purposes, in FIGS. 1 and 2, arrows illustrate the flow, e.g., of the flue gas 10, feedstream 20, and product stream 30, within the system.

As embodied herein, the one or more reaction panels 101 can include multiple reaction tubes 102. The reaction tubes can be vertically-oriented within the reaction panel, and can be arranged in a parallel configuration. With reference to FIG. 2, a reaction panel can include more than one row of reaction tubes. For example, a reaction panel can include a second row 103 and, optionally, a third row of reaction tubes. Alternatively, the reaction panel can include a single row of reaction tubes. In certain embodiments, each row of the reaction panel 101 can include at least five, at least ten, at least twenty, at least forty, or at least sixty reaction tubes 102.

As embodied herein, each reaction tube 102 can include a fixed catalyst bed 104. In certain embodiments, only a portion of the reaction tubes contains a catalyst bed. The catalyst bed can contain a catalyst, e.g., in the form of pellets. The type and amount of catalyst can be selected based on the desired chemical reaction, reactants, and reaction conditions, and can be a single catalyst or a mixture of multiple catalysts. By way of example, all reaction tubes can contain the same catalyst. Alternatively, the reaction tubes can contain one or more different catalysts. By way of further example, one or more reaction tubes can include two or more different catalysts. For example, two or more different types of particulate catalysts can be stacked in two or more layers within a reaction tube. Alternatively or additionally, one or more reaction tubes can further include inert particles, such that one or more layers of a catalyst alternate with one or more layers of inert particles in the reaction tube. In certain embodiments, all reaction tubes contain the same types and/or same amounts of catalysts and, optionally, inert particles. For purpose of illustration, and not by way of limitation, suitable inert particles include dense aluminum oxide, silicon oxide, and/or silicon carbide.

With further reference to FIGS. 1 and 2, the multiple reaction tubes 102 can be coupled to a feed header 105. For example, and as embodied herein, a feedstream can enter the feed header 105 through an inlet 106 and be distributed to one or more reaction tubes 102. The feed header 105 can be a horizontally-oriented tube that is in fluid communication with one or more reaction tubes 102. The feed header 105 can have a circular or non-circular cross-section. The feed header 105 can include one or more fitting devices, such as flanges, lids, plugs, and/or hinges to allow access to the catalyst beds 104. In certain embodiments, the fitting devices can be provided on an upper portion of the feed header. For example, and not limitation, all or a portion of the feed header can be detachable to allow access to the catalyst beds. The fitting devices can be configured such that the catalyst beds 104 are reclosable in a gas-tight manner.

Figure 3:
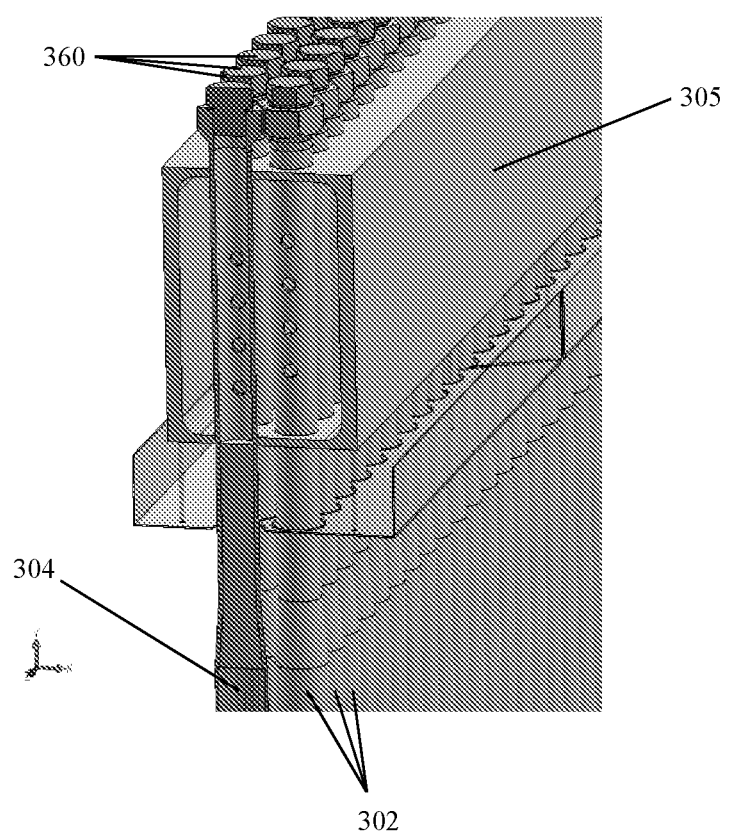
FIG. 3 depicts a perspective view of an exemplary feed header according to one embodiment of the disclosed subject matter.

Although other suitable configurations of the feed header are contemplated herein, FIG. 3 provides one embodiment. As depicted in FIG. 3, in certain embodiments, the reaction tubes 302 can project through the feed header 305. In this manner, the reaction tubes 302 can act as stays to anchor the feed header 305. The reaction tubes 302 can be perforated to allow the feedstream to flow from the feed header 305 to the reaction tubes 302. In certain embodiments, the reaction tubes 302 can project through the feed header 305 and exit at the top of the feed header. The top ends of the projected reaction tubes 302, which project through the feed header 305, can be fitted with screw plugs 360 to permit access to the catalyst beds 304 in each of the reaction tubes 302.

With reference to FIGS. 1 and 2, the multiple reaction tubes 102 can be further coupled to a product header 107. The product header 107 can also be a horizontally-oriented tube that is in fluid communication with one or more reaction tubes. The product header 107 can have a circular or non-circular cross-section. For example, a product stream 30 can exit a reaction tube 102 through the product header 107 and be combined with the product streams of other reaction tubes. The combined product streams can exit the product header 107 through an outlet 108.

The one or more reaction panels 101 can be disposed within a furnace. By way of example, and not limitation, the furnace can be coupled to a burner system including one or more burners. One or more burners within the burner system can combust a fuel gas and generate a flue gas that travels into the furnace. In certain embodiments, the burner system can be disposed in a combustion chamber, and the flue gas 10 can be transferred to the furnace via one or more ducts and enter the furnace via one or more openings 155. In certain embodiments, the flue gas ductwork of the disclosed system is refractory lined.

As embodied herein, a closed top of the furnace can be defined by a furnace ceiling 151. The furnace ceiling can be sealed to prevent the escape of flue gas. As embodied in FIGS. 1 and 2, at least a portion of the feed header 105 can be located above the furnace ceiling 151. By way of example, an upper portion of the feed header 151, e.g., a portion that includes one or more fitting devices, can be positioned above the furnace ceiling 151 to protect the one or more fitting devices from exposure to hot flue gas. In other embodiments, the entire feed header can be positioned above the furnace ceiling. In this manner, the feed header can be separated from hot flue gas, e.g., to reduce fouling and/or coking in the feed header. Additionally, if the feed header is not required to withstand the high temperatures of the flue gas, it can be made of a less expensive material. For example, in certain embodiments, the feed header can be made of stainless steel.

With reference to FIGS. 1 and 2, and as embodied herein, the furnace walls 153 can include one or more openings 155 to provide an inlet for flue gas. The one or more slits 153 can be in fluid communication with the distribution chamber 125, such that flue gas can travel through a slit and into the distribution chamber. In certain embodiments, an opening 155 can be provided on either side of the distribution chamber 125, for example, as depicted in FIG. 1. Additionally or alternatively, multiple slits can be provided on one or both sides of the distribution chamber. In certain embodiments, the bottom of the opening 155 is approximately level with the bottom of the distribution chamber 125, such that flue gas enters towards the bottom of the distribution chamber. The opening 155 can have a height that is less than or equal to the height of the distribution chamber 125. With reference to FIG. 2, the distribution chamber 125 can be defined by at least two guiding walls 121. The guiding walls can define a distribution 125 chamber having parallel sidewalls, an open top, and a closed bottom 122. The guiding walls 121 can span the entire width of the furnace, and be joined on both sides to the furnace wall 153 such that all of the flue gas that passes through the opening 155 flows into the distribution chamber 125. In this manner, the distribution chamber 125 is configured such that flue gas within the distribution chamber is not in contact with the reaction tubes 102, particularly, those portions of the reaction tubes containing the catalyst beds 104.

As embodied herein, the system can include multiple distribution chambers defined by multiple guiding walls. For example, in embodiments having multiple reaction panels, a distribution chamber can be disposed between each pair of reaction panels, as depicted in FIG. 2. Accordingly, in such embodiments, the furnace wall 153 can include multiple openings 155 to permit flue gas to flow to each distribution chamber.

Although the flue gas that enters through the one or more openings 155 can have a horizontal velocity component, the distribution chamber 125 can redirect the flow of the flue gas to be predominantly vertical and upwards. In certain embodiments, one or more guiding features can be present within the distribution chamber to facilitate the redirection of the flue gas. However, a person having ordinary skill in the art will appreciate that the guiding features are not a necessary component of the disclosed system.

With further reference to FIGS. 1 and 2, the distribution chamber 125, as defined by the guiding walls 121, can have an open top that is below the furnace ceiling 151. The space between the furnace ceiling 151 and the top of the distribution chamber 125 can form a deflection zone 131. The height of the deflection zone can be designed to create a certain pressure drop. For example, the deflection zone can be sufficiently narrow at the point between the top of the guiding wall 121 and the furnace ceiling 151 to impose a pressure drop on the flow of the flue gas. Providing a pressure drop can more evenly distribute the flue gas. In certain embodiments, for example as depicted in FIG. 2, the top of the guiding wall 121 can also include a diagonal component for guiding the flow of flue gas into the deflection zone 131. The diagonal component can be linear or curved. In certain embodiments, the deflection zone can further include an additional guiding wall (not pictured) that is below the furnace ceiling 151 and above the distribution chamber 125 to redirect the flue gas. The additional guiding wall can be curved or linear. The deflection zone 131 can turn the flue gas flow downward such that it is co-current with the feedstream inside the reaction tubes 102 while minimizing flow in the horizontal direction.

In certain embodiments, flue gas can travel upwards within the deflection zone 131, for example, until reaching the furnace ceiling 151 or an additional guiding wall in the deflection zone 131. The deflection zone 131 can redirect the flue gas downwards. The flue gas can travel downwards through a convection chamber 135, which is defined between a guiding wall 121 and a reaction panel 101. In this way, the flue gas will travel co-currently with the feedstream in the reaction tubes 102 and will contact the reaction tubes at those portions of the reaction tubes containing the catalyst beds 104. Additionally, the system is configured to minimize the horizontal velocity component of the downward flow of flue gas. The number of convection chambers present within the system will depend on the number of reaction panels and guiding walls within the system.

As embodied herein, the system can further include a flue gas outlet zone 141. After traveling downwards through the one or more convection chambers 135, the flue gas can pool in the flue gas outlet zone 141 and before exiting through an outlet 142. For example, and not limitation, the outlet 142 can be one or more openings, for example, circular or rectangular openings, in the furnace wall 153 to permit the flow of cool flue gas 40 from the furnace.

Figure 4:
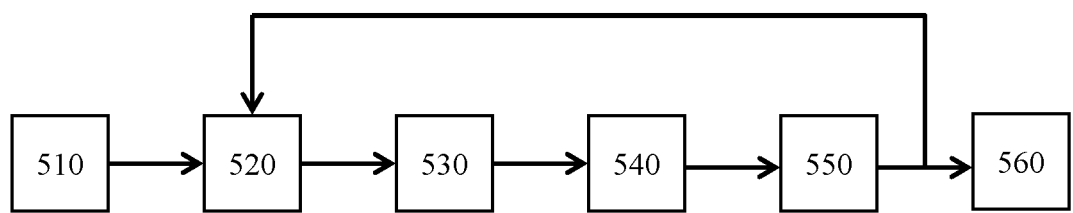
FIG. 4 provides a flow diagram depicting the recirculation of flue gas according to an exemplary embodiment of the disclosed subject matter.

In certain embodiments, at least a portion of the cool flue gas 40 from the flue gas outlet zone 141 can be recirculated to the distribution chamber 125. Alternatively or additionally, cool flue gas 40 exiting through the outlet 142 can be utilized for waste heat recovery. For the purpose of illustration, and not limitation, FIG. 4 provides an exemplary flow diagram of flue gas recirculation including waste heat recovery. As described previously, hot flue gas can be generated in a combustion chamber 510 of a burner system and transferred to a flue gas mixing chamber 520. In certain embodiments, the combustion chamber 510 can be disposed within the flue gas mixing chamber 520. An induced draft fan 550 can provide a draft to draw the flue gas from the flue gas mixing chamber 520 and through the furnace 530 and waste heat recovery unit 540. Upon exiting the induced draft fan 550, flue gas can be recirculated towards the flue gas mixing chamber 520. Prior to entering the flue gas mixing chamber 520, a portion of the flue gas can be diverted to an exhaust stack 560 to balance the flow and maintain adequate pressure within the duct system. The remaining flue gas can enter the flue gas mixing chamber 520 and mix with hot flue gas generated by the combustion chamber 510. With reference to FIGS. 1 and 2, and in certain embodiments, the amount of recirculated flue gas can be modulated to control the temperature of the flue gas within the distribution chamber 125. For example, the ratio of recirculated flue gas to hot flue gas can be adjusted to alter the temperature of the flue gas in the distribution chamber 125.

Figure 5:
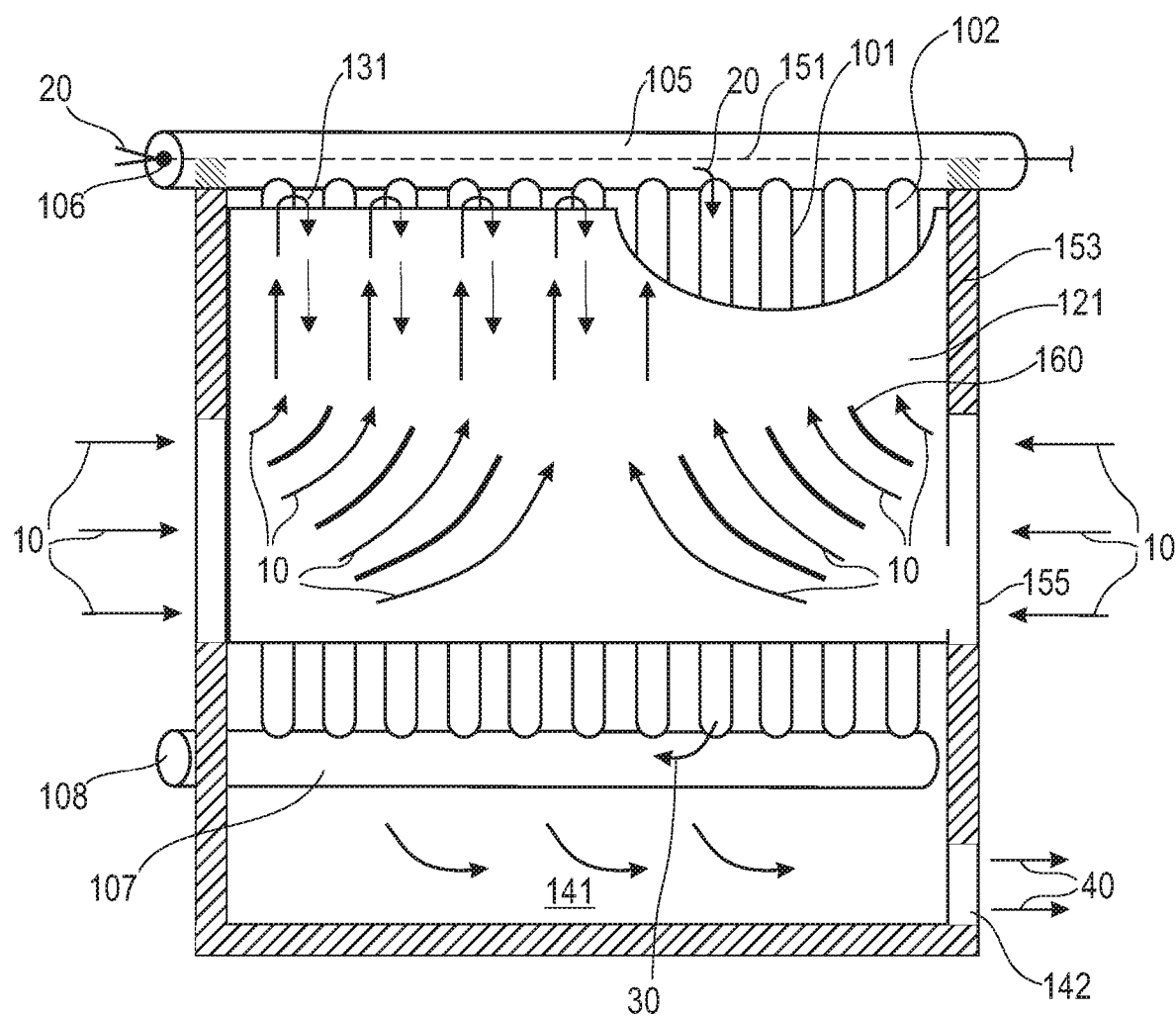
FIG. 5 depicts a front view of a system for heating a multi-tubular reactor according to an exemplary embodiment having baffles within the distribution chamber.
Figure 6:
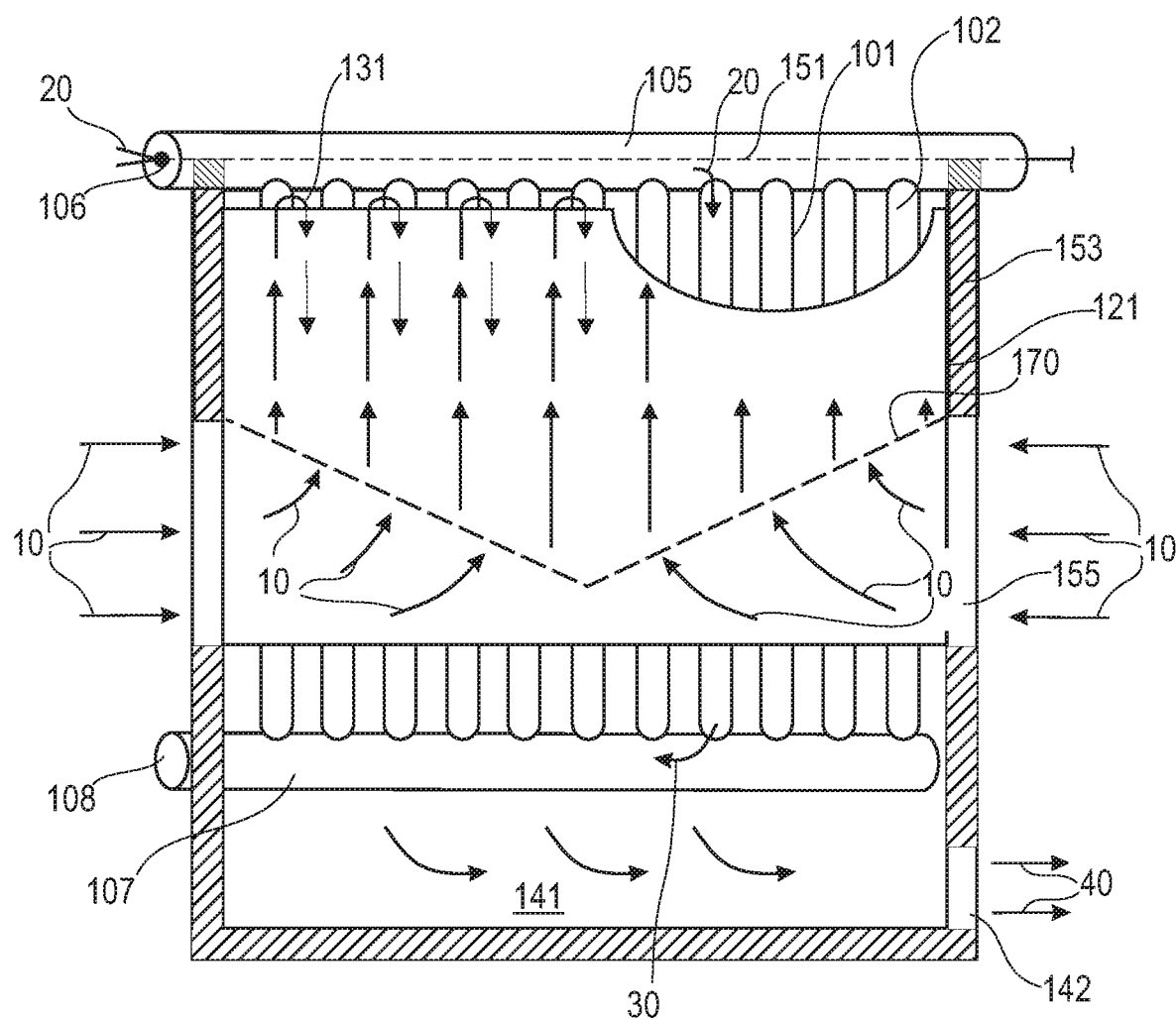
FIG. 6 depicts a front view of a system for heating a multi-tubular reactor according to an exemplary embodiment having a distributor within the distribution chamber.
Figure 7:
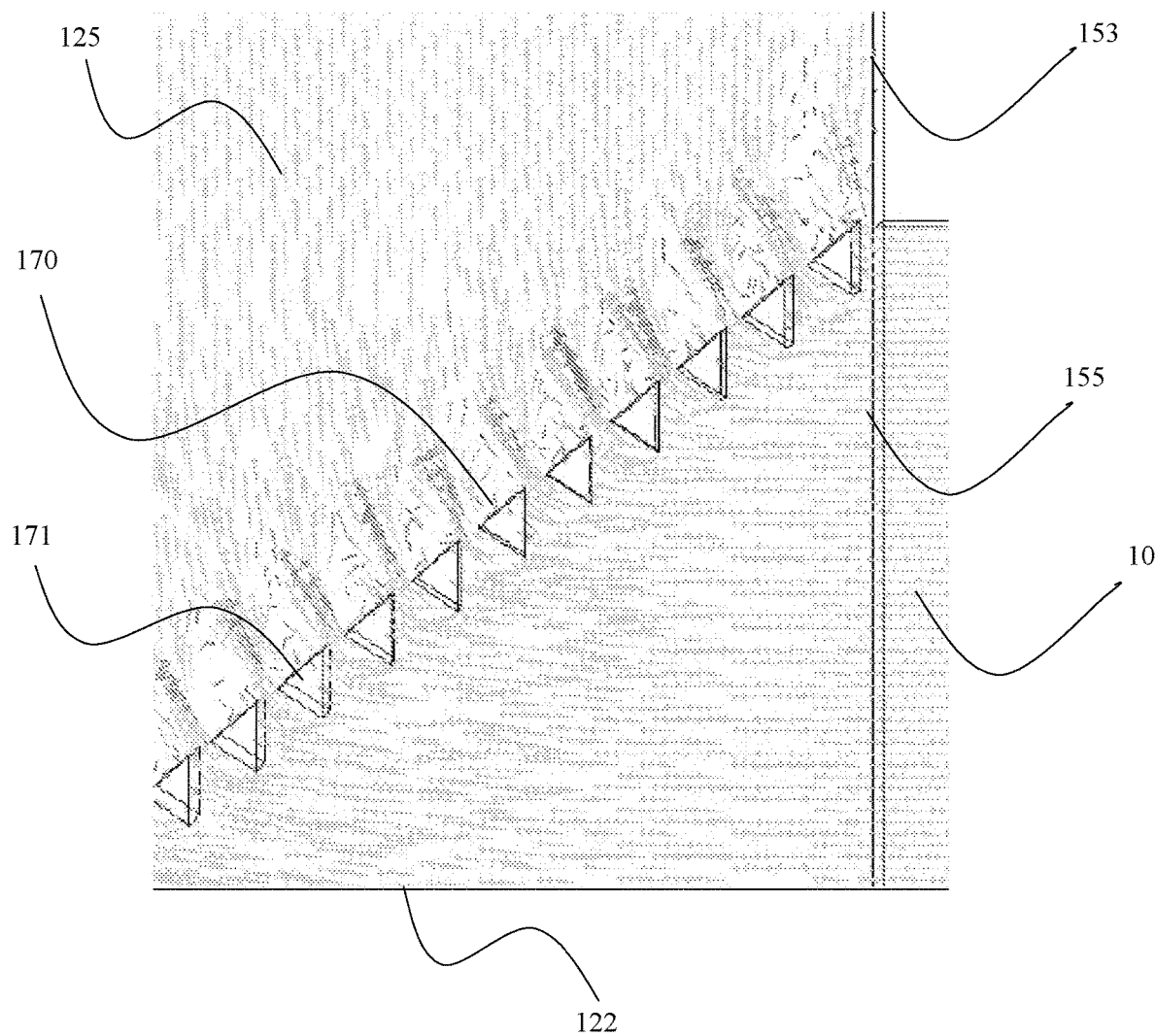
FIG. 7 depicts a cross-sectional side view of a system for heating a multi-tubular reactor according to an exemplary embodiment having parallel rods within the distribution chamber.

As embodied herein, the distribution chamber 125 can include certain additional features. For example, in certain embodiments, and with reference to FIG. 5, the distribution chamber can include one or more baffles 160. As embodied in FIG. 5, the baffles can be curved to facilitate the redirection of the flue gas. Alternatively, the baffles can be linear and angled to redirect the flue gas, or can have any other suitable shape that facilitates the redirection of flue gas. In certain other embodiments, and with reference to FIG. 6, the distribution chamber can include a distributor 170 for redirecting the flue gas. The distributor 170 can connect two adjacent guiding walls 121 and can include one or more openings. For example, the distributor 170 can be a plate that includes one or more perforations to force the flue gas through the distributor and to create upward flow within the distribution chamber. As embodied in FIG. 6, the distributor 170 can be in the shape of a downward chevron. Alternatively, the distributor can be in the shape of a downward curve. As a further alternative, the distributor can be linear and horizontal. The distributor 170 can be joined to the furnace wall 153 at a point level with or above the top of an opening 155. Alternatively, and with reference to FIG. 7, which shows a cross-sectional side view of another exemplary distribution chamber, the distributor 170 can include multiple parallel rods 171 connecting two adjacent guiding walls and arranged in the form of a distributor. The rods can have a circular or any polygonal cross-section. In certain embodiments, for example, as shown in FIG. 7, the rods 171 can have a triangular cross-section such that one corner of the triangle is directed against the flue gas flow and one flat side of the triangle is directed into the direction of the flue gas flow (i.e., such that a flat side of the triangle is downstream from a corner of the triangle). In certain embodiments, and as shown in FIG. 7, the topmost rods 171 can be joined to the furnace wall 153 at a point level with or above the top of an opening 155.

In alternative embodiments of the disclosed subject matter, a distributor can be used to direct the flow of flue gas within the system. For example, as embodied in FIG. 8, the reaction tubes 802 of a reaction panel 801 can intersect a horizontal distributor 871. The distributor 871 can thereby define a distribution chamber 826 above the distributor and can include openings in fluid communication with one or more convection chambers 828 defined adjacent to and between the reaction tubes 802. Although the reaction tubes 802 intersect the distributor 871, the distributor does not extend into the interior of the reaction tubes.

Figure 8:
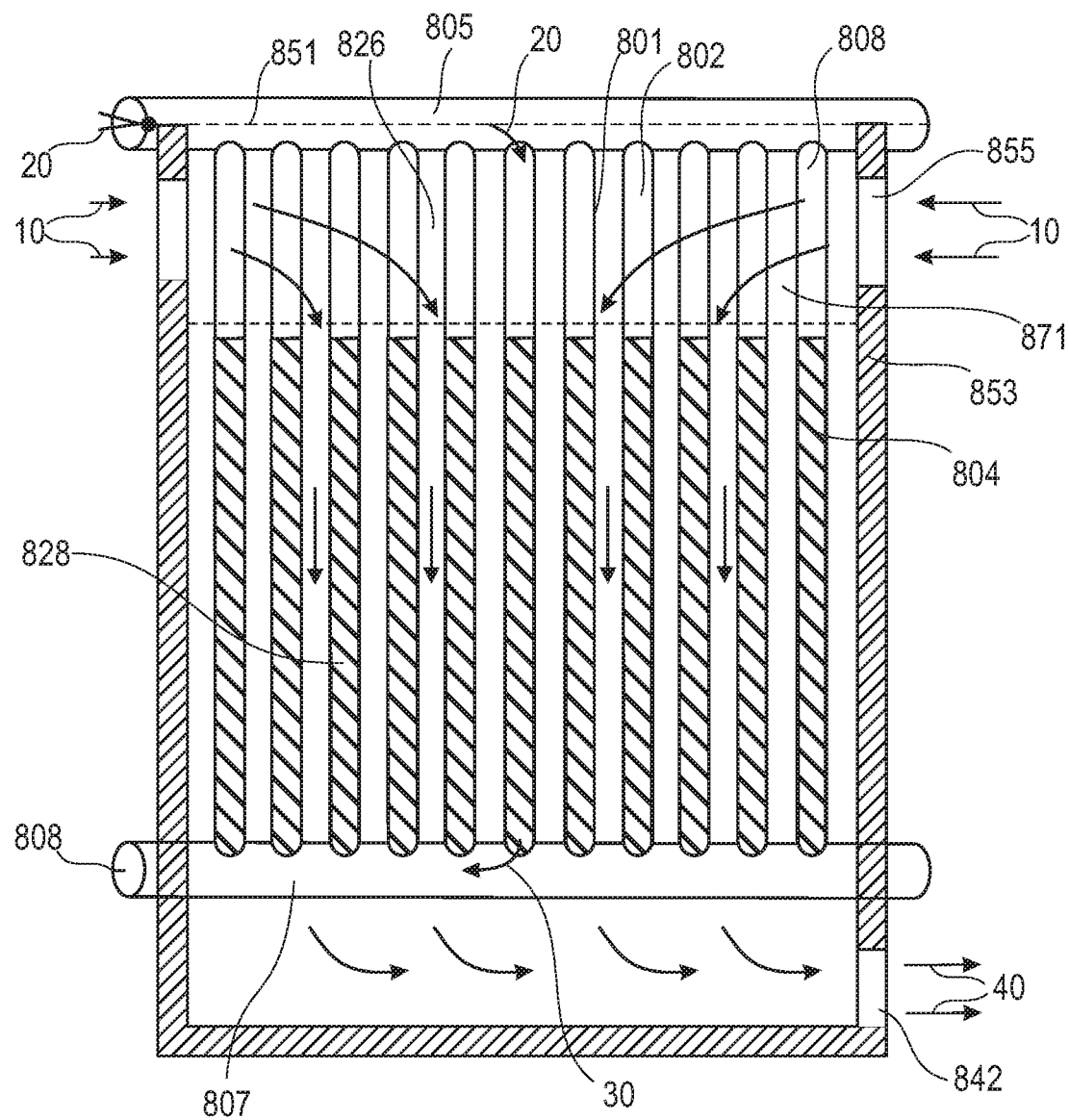
FIG. 8 depicts a front view of a system for heating a multi-tubular reactor according to a further exemplary embodiment of the disclosed subject matter.

Hot flue gas can enter the distribution chamber 826 through an opening 855 in the furnace wall 853 at a point above the distributor 871. As illustrated in FIG. 8, the distributor 871 can be a perforated plate including perforations at points between reaction tubes 802, and which can form a seal around the circumference of the reaction tubes. In this way, the flue gas can be directed downwards through the perforations. Alternatively, the distributor 871 can consist of slotted elements attached to the circumference of the reaction tubes 802 to define openings through which flue gas can flow. Additionally or alternatively, the distributor 871 can include one or more flow restrictors for directing the flow of flue gas. The perforations, slotted elements, and/or flow restrictors can direct the flue gas to ensure that it flows predominantly downward in the convection chambers 828 and co-current with the flow of the feedstream 20 and contacts the reaction tubes 802. For exemplary purposes, in FIG. 8, arrows illustrate the flow, e.g., of the flue gas 10, feedstream 20, and product stream 30, within the system.

In these embodiments, reaction panels 801 and reaction tubes 802 can have any of the features discussed above in connection with FIGS. 1 and 2. For example, the reaction tubes 802 can be coupled to a feed header 805 and/or a product header 807. As discussed above, one or more reaction tubes 802 can contain a catalyst bed 804. In certain embodiments, the height of the catalyst bed 804 can be less than or equal to the height of the reaction tube 802, such that the reaction tube includes an upper portion 808 that does not contain the catalyst bed. This upper portion 808 can have a height that is greater than or equal to the height of the distribution chamber 826 such that flue gas in the distribution chamber 826 does not contact the portion of the reaction tubes 802 that contains the catalyst beds 804. Similarly, the convection chambers 828 can direct the flue gas downwards and adjacent to the reaction tubes 802, such that flue gas in the convection chambers 828 contacts the portion of the reaction tubes that contains the catalyst beds 804. The upper portion 808 of the reaction tubes can be empty or can be filled with inert particles. In certain embodiments, the upper portion 808 can be insulated to maintain the temperature of the feedstream. Alternatively, the feedstream can be preheated in the upper portion 808 of the reaction tubes 802. A reaction tube configuration including an upper portion 808 will ensure that the horizontal velocity component of the flue gas is suppressed before it heats the catalyst bed 804, i.e., that the top of the catalyst bed 804 is below the upper distribution chamber 826. Limiting the heights of the catalyst beds can improve temperature control within the catalyst beds and ensure a uniform heat distribution.

The presently disclosed systems can further include additional components and accessories including, but not limited to, one or more fuel supply lines, one or more combustion air fans, one or more flue gas exhaust lines, product discharge lines, heat exchangers (e.g., for heating the feedstream, cooling the product stream, preheating combustion air, and/or recovering heat from the flue gas), one or more flue gas stacks, and one or more measurement accessories. The one or more measurement accessories can be any suitable measurement accessory known to one of ordinary skill in the art including, but not limited to, flow monitors, pressure indicators, pressure transmitters, temperature indicators, gas detectors, gas analyzers, and oxygen and carbon monoxide monitoring devices. The components and accessories can be placed at various locations within the system. Various automatic controllers can use the data measured by the measurement accessories for controlling various temperatures and flow rates.

The systems of the presently disclosed subject matter can be used in various chemical processes. By way of example, and not limitation, the systems can be used in various catalytic endothermic gas-phase reactions. For example, such reactions can include catalytic reforming, dehydrogenations of C2 through C5 alkanes to generate olefins (e.g., ethylene, propylene, and/or isobutylene), dehydrogenations of mixtures of C2 through C5 alkanes and olefins to generate diolefins (e.g., butadiene and/or isoprene), dehydrogenation of ethylbenzene to styrene, non-oxidative dehydrogenations of alcohols to aldehydes (e.g., methanol to formaldehyde and/or ethanol to acetaldehyde), and dehydrations of carbon acids to their anhydrides. In certain embodiments the system can be used in the catalytic reforming of hydrocarbons, e.g., to produce benzene and/or naphthalene. In still other embodiments, the system can be used in the dehydrogenation of light alkanes, e.g., to produce ethylene and/or propylene. By way of example, and not limitation, the system can be advantageously used in the dehydrogenation a hydrocarbon having at least one saturated carbon bond, for example C2 through C8 alkanes (e.g., ethane, propane, (iso)butane, (iso)pentane, and ethyl benzene). In such reactions conversion can be improved at high reaction temperatures (e.g., from about 500° C. to about 750° C.), and thus the reaction will benefit from continuous heat supply from a flue gas along the lengths of the reaction tubes.

The systems of the presently disclosed subject matter provide advantages over certain existing technologies. Exemplary advantages include efficient convective heating of the reaction tubes inside a multi-tubular reactor using a flue gas in the absence of radiant heat transfer from the burner flames. Additionally, by suppressing the horizontal velocity component of the flue gas the same amount of heat is transferred to each reaction tube using flue gas having a homogenous temperature in a horizontal direction. Furthermore, when used in catalytic processes, the disclosed systems can allow co-current flow of the flue gas and feedstream through the reaction tubes without a horizontal velocity component, while its mechanical construction allows access to catalyst beds at conditions under which the openings are reclosable in a gas-tight manner.

In addition to the various embodiments depicted can claimed, the disclosed subject matter is also directed to other embodiments having other combinations of the features disclosed and claimed herein. As such, the particular features presented herein can be combined with each other in other manners within the scope of the disclosed subject matter such that the disclosed subject matter includes any suitable combination of the features disclosed herein. The foregoing description of specific embodiments of the disclosed subject matter has been presented for purposes of illustration and description. It is not intended to be exhaustive or to limit the disclosed subject matter to those embodiments disclosed.

The invention claimed is:

1. A system for heating a multi-tubular reactor with a flue gas, comprising:
   (a) one or more combustion chambers in fluid communication with a furnace;
   (b) one or more reaction panels comprising multiple vertically-oriented parallel reaction tubes disposed within the furnace, wherein at least a portion of each reaction tube comprises a catalyst bed;
   (c) one or more distribution chambers arranged such that flue gas within the distribution chambers does not contact the portion of the reaction tubes that comprises the catalyst beds;
   (d) one or more convection chambers arranged such that flue gas within the convection chambers contacts the portion of the reaction tubes that comprises the catalyst beds, wherein:
      i. the flue gas is generated within the one or more combustion chambers;
      ii. the flue gas enters the one or more distribution chambers; and
      iii. the flue gas exits through the distribution chambers and into the one or more convection chambers;
      wherein each distribution chamber has a closed bottom and an open top and is defined by at least two vertically-oriented guiding walls, and wherein each distribution chamber is disposed adjacent to at least one reaction panel.

2. The system of claim 1, wherein each guiding wall spans an entire width of the furnace.

3. The system of claim 1, further comprising one or more deflection zones above the one or more distribution chambers and in fluid communication with the one or more convection chambers.

4. The system of claim 1, wherein the one or more distribution chambers are above the one or more convection chambers and defined by a distributor comprising openings, wherein the distributor is in fluid communication with the one or more convection chambers.

5. The system of claim 1, wherein the one or more combustion chambers comprise one or more burner systems.

6. The system of claim 1, further comprising a feed header, coupled to two or more of the reaction tubes and disposed above the reaction tubes, for distributing a feedstream to the reaction tubes to create a flow within the reaction tubes.

7. The system of claim 6, further comprising a product header, coupled to two or more of the reaction tubes and disposed below the reaction tubes, for combining two or more product streams from the reaction tubes.

8. The system of claim 6, wherein the flue gas travels downward through the one or more convection chambers co-currently with the flow within the reaction tubes.

9. The system of claim 6, wherein the furnace includes a furnace ceiling that defines a closed top, and at least a portion of the feed header extends above the furnace ceiling.

10. The system of claim 6, wherein the entire feed header is disposed above the furnace ceiling.

11. The system of claim 6, wherein the feed header comprises one or more fitting devices.

12. The system of claim 1, wherein the furnace comprises one or more slits in fluid communication with the distribution chamber.

13. The system of claim 1, wherein the one or more distribution chambers comprise one or more baffles.

14. The system of claim 13, wherein the baffles are curved.

15. The system of claim 1, wherein the distribution chamber comprises a distributor having one or more openings.

16. The system of claim 15, wherein the distributor comprises a plurality of parallel rods.

17. The system of claim 16, wherein the rods have a triangular cross-section.

18. The system of claim 15, wherein the distributor forms a downward chevron.

19. The system of claim 1, wherein the distribution chamber comprises a distributor having one or more openings.

20. The system of claim 1, wherein the one or more combustion chambers comprise one or more burner systems.

* * * * *